(12) United States Patent  (10) Patent No.: US 8,280,453 B2
Beart et al.  (45) Date of Patent: Oct. 2, 2012

(54) ADAPTING PORTABLE ELECTRICAL DEVICES TO RECEIVE POWER WIRELESSLY

(75) Inventors: Pilgrim G. W. Beart, Cambridge (GB); David P. Whitewood, East Sussex (GB); Lily Ka-Lai Cheng, London (GB); James W. Hay, Cambridge (GB)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 13/036,637

(22) Filed: Feb. 28, 2011

(65) Prior Publication Data

US 2011/0210619 A1  Sep. 1, 2011

Related U.S. Application Data

(63) Continuation of application No. 10/539,062, filed as application No. PCT/GB03/05470 on Dec. 16, 2003.

(30) Foreign Application Priority Data

Dec. 16, 2002 (GB) .................................. 0229141.7

(51) Int. Cl.
  H04M 1/00 (2006.01)
  H04B 1/38 (2006.01)
  G08B 5/22 (2006.01)
  H04Q 1/30 (2006.01)
  G08B 23/00 (2006.01)
  G01V 3/00 (2006.01)

(52) U.S. Cl. .................... 455/572; 455/41.1; 340/855.8; 340/693.1; 340/7.32

(58) Field of Classification Search ................. 455/41.1, 455/41.2, 571, 572; 340/854.8, 855.8, 693.1, 340/7.32, 7.36

See application file for complete search history.

(56) References Cited

U.S. PATENT DOCUMENTS

| 3,938,018 A | 2/1976 | Dahl |
| 5,455,467 A | 10/1995 | Young et al. |
| 5,959,433 A | 9/1999 | Rohde |
| 6,028,555 A | 2/2000 | Harano |

(Continued)

FOREIGN PATENT DOCUMENTS

CN  2480996 Y  3/2002

(Continued)

OTHER PUBLICATIONS

Office Action, Japanese Patent Application No. 2004-559903, Dated May 12, 2009.

(Continued)

*Primary Examiner* — Andrew Wendell (74) *Attorney, Agent, or Firm* — Warner Norcross & Judd LLP (57) ABSTRACT

Wireless power receiving apparatus 150 is retrofitted to a portable electrical device 100 to enable the device to receive power wirelessly. The apparatus comprises a power-receiving element 200 adapted to be attached to the device, e.g. by adhesive 201, and also being adapted to receive power wirelessly from a transmitter of power when the element and transmitter are in proximity with one another. One or more power connectors 203 are connected electrically to the power-receiving element and are adapted to be connected, when the apparatus is in use, to one or more corresponding power connectors 101 of the portable electrical device to deliver power received by the element to the device. The power-receiving element may be in the form of a sticker or may be carried by or incorporated in a replacement cover portion for the portable electrical device.

23 Claims, 9 Drawing Sheets

U.S. PATENT DOCUMENTS

| | | |
|---|---|---|
| 6,208,115 B1 | 3/2001 | Binder |
| 6,275,681 B1 | 8/2001 | Vega et al. |
| 6,803,744 B1 | 10/2004 | Sabo |
| 7,164,255 B2 | 1/2007 | Hui |
| 7,392,068 B2 | 6/2008 | Dayan et al. |
| 2002/0042291 A1 | 4/2002 | Lahteenmaki et al. |
| 2002/0057584 A1 | 5/2002 | Brockmann |
| 2002/0099894 A1 | 7/2002 | Kehoe et al. |
| 2003/0128010 A1 | 7/2003 | Hsu |
| 2003/0132731 A1 | 7/2003 | Chung |
| 2003/0231001 A1 | 12/2003 | Bruning |
| 2004/0048511 A1 | 3/2004 | Dayan et al. |
| 2004/0054941 A1 | 3/2004 | Seiler et al. |
| 2004/0066169 A1 | 4/2004 | Bruning |
| 2004/0082369 A1 | 4/2004 | Dayan et al. |
| 2004/0130425 A1 | 7/2004 | Dayan et al. |
| 2004/0131928 A1 | 7/2004 | Dayan et al. |
| 2004/0142726 A1 | 7/2004 | Dayan et al. |
| 2004/0142733 A1 | 7/2004 | Parise |
| 2004/0240696 A1 | 12/2004 | Shively et al. |
| 2005/0127869 A1 | 6/2005 | Calhoon et al. |
| 2005/0189910 A1 | 9/2005 | Hui |
| 2005/0192062 A1 | 9/2005 | Mickle et al. |
| 2007/0032274 A1 | 2/2007 | Lee et al. |
| 2007/0178945 A1 | 8/2007 | Cook et al. |
| 2009/0179501 A1 | 7/2009 | Randall |

FOREIGN PATENT DOCUMENTS

| | | |
|---|---|---|
| EP | 1117068 | 7/2001 |
| EP | 1221753 | 7/2002 |
| GB | 0210886.8 | 5/2002 |
| GB | 0213024.3 | 6/2002 |
| GB | 0213374.2 | 6/2002 |
| GB | 0225006.6 | 10/2002 |
| GB | 0228425.5 | 12/2002 |
| GB | 2388715 | 11/2003 |
| GB | 2388716 | 11/2003 |
| GB | 2389720 | 12/2003 |
| GB | 2389767 | 12/2003 |
| GB | 2399466 | 9/2004 |
| JP | H06-005231 | 1/1994 |
| JP | 09190938 | 7/1997 |
| JP | 2000166112 | 6/2000 |
| JP | 2001060998 | 3/2001 |
| JP | 2001251207 | 9/2001 |
| JP | 2001352698 | 12/2001 |
| JP | 2002148325 | 5/2002 |
| JP | 2002262468 | 9/2002 |
| JP | 2002325367 | 11/2002 |
| JP | 2002359676 | 12/2002 |
| WO | 9602879 | 2/1996 |
| WO | 02095555 | 11/2002 |
| WO | 03075415 | 9/2003 |
| WO | 03075416 | 9/2003 |
| WO | 03096361 | 11/2003 |
| WO | 03096512 | 11/2003 |
| WO | 03105308 | 12/2003 |
| WO | 2004015885 | 2/2004 |
| WO | 2004027656 | 4/2004 |
| WO | 2004036774 | 4/2004 |
| WO | 2004073176 | 8/2004 |

OTHER PUBLICATIONS

Office Action, Japanese Patent Application No. 2004-559903, Mailed Dec. 8, 2009.

Scott et al; "Networked Surfaces: A New Concept in Mobile Networking;" Laboratory for Communications Engineering—Cambridge University Engineering Department; 10-24-1001, Sep. 25, 2002.

Scott et al; "Networked Surfaces: A New Concept in Mobile Networking;" Laboratory for Communications Engineering—Cambridge University Engineering Department, Oct. 24, 2001.

Scott et al, "Networked Surfaces: A New Concept in Mobile Networking," Laboratory for Communications Engineering, Cambridge University Engineering Department, Oct. 24, 2001.

Scott et al, "Networked Surfaces: A New Concept in Mobile Networking," Laboratory for Communications Engineering, Cambridge University Engineering Department, published Dec. 2000.

Scott et al, "Networked Surfaces: A Novel LAN Technology," Sep. 25, 2002.

Hoffman et al, "Data Transport on the Networked Surface," Laboratory for Communications Engineering, University of Cambridge, Nov. 2001.

Hoffman, et al, "Location of Mobile Devices Using Networked Surfaces," Laboratory for Communications Engineering, Cambridge University Engineering Department, Sep. 2002.

Arnold Fixed My Mousepad Charger web page printed Jun. 17, 2003.

Reexamination Report, Japanese Application No. 2004-559903, dated Jul. 22, 2010.

Extended European Search Report for EP10187345.3 dated Mar. 9, 2011.

Extended European Search Report for EP10187343.8 dated Mar. 9, 2011.

Extended European Search Report for EP10187342.0 dated Mar. 9, 2011.

European Examination Report for 03786118.4 dated Mar. 14, 2011.

European Search Report, Reference P100700EPPC04, Application No./Patent No. 11152593.7 -2207, May 11, 2011.

Preliminary Notice of Reasons for Rejection, Japanese Application No. 2004-559903, mailed Aug. 23, 2011.

ADAPTING PORTABLE ELECTRICAL DEVICES TO RECEIVE POWER WIRELESSLY

The present invention relates to adapting portable electrical devices to receive power wirelessly.

Many of today's portable devices contain an internal secondary cell or battery which may be recharged by temporarily attaching an external adaptor to the power connector of the device. However this is something of a nuisance for users because it requires manual dexterity, requires both hands, and, especially, because different manufacturers use incompatible connectors, so the right adaptor must be located for each device.

Various means have been proposed for charging devices without the need to attach an external adaptor. These include:

- A surface providing power by presenting an array of contacts which then mate with receiving contacts on the device. Examples include:
  - In academia, the "Networked Surfaces" research conducted by James Scott and Frank Hoffman of the Laboratory for Communications Engineering, Engineering Department, University Of Cambridge, U.K.
  - In business, the wire-free electricity base proposed by MobileWise Inc., U.S.A.
- A surface providing power to devices by induction, without any contacts, for example as disclosed in patent publication no. WO-A-03/96512. In this system, the device incorporates a substantially flat element for receiving power inductively, conditioning it and then providing it to the device's battery and electronics.

These solutions typically require a device design to be modified, typically by the Original Equipment Manufacturer, in order to incorporate the power-receiving element during manufacture. However there are a very large number of existing portable devices which are not already enabled. It would therefore be convenient to have a solution whereby the user could enable an existing device by simply retrofitting a power-receiving element to it.

According to a first aspect of the present invention, there is provided wireless power receiving apparatus for use with a portable electrical device to enable the device to receive power wirelessly, the apparatus comprising: a power-receiving element adapted to be attached to the device, and also being adapted to receive power wirelessly from a transmitter of power when the element and transmitter are in proximity with one another; and one or more power connectors which, when the apparatus is in use, are connected electrically to the power-receiving element and are adapted to be connected to one or more corresponding power connectors of the portable electrical device to deliver power received by the element to the device.

The benefit of the invention is that it enables users to add wireless power transfer capability to their existing portable devices easily.

In use, the user simply attaches the power-receiving element to the portable device and then connects the power connector(s) to the corresponding power connector(s) (power-input) of the portable device, thus enabling the device to receive power without wires from a transmitter of power (e.g. an external charger) for example by way of electromagnetic induction.

The means of attaching the power-receiving element to the device might be an adhesive, or might be some mechanical means such as a clip. The power receiving element could alternatively snap-fit on the device or slide on to it. The element may be removable or permanently attached once applied.

Yet another way of attaching the power-receiving element to the portable electrical device is to have a rigid connection between the power-receiving element and at least one of the power connectors. In this case, connection of that power connector or those power connectors to the corresponding power connector(s) on the portable electrical device serves to attach the power-receiving element mechanically to the device without the need for any separate attaching means such as adhesive or a clip.

Another way of attaching the power-receiving element to the portable electrical device is to form the power-receiving element as part of a replacement cover portion of the portable electrical device. Some devices, such as mobile phones, have replaceable cover portions so that the user can change the appearance or "skin" of the device.

Optionally, the power-connector(s) may be attached to the power-receiving element by a flexible connecting member, allowing the power-connector(s) to be inserted and removed from the device's power-input while the power-receiving element remains attached for convenient future use. Preferably, the flexible connecting member also serves to connect the one or more power connectors electrically to the power-receiving element.

In one embodiment the electrical connections (e.g. wires) extending between the power-receiving element and power connectors are detachable from the power-receiving element and/or from the power connectors when the apparatus is not in use. This can enable the electrical connections and the power connectors to be removed to protect them from possible damage whilst still leaving the power-receiving element attached.

By having the electrical connections detachable it is also possible to offer a single design of power-receiving element but several different designs of power connector (or power connector plus electrical connection such as a flying lead) for use with different portable electrical devices.

Optionally, the power-connector may itself incorporate a contact means similar to the power-receiving input of the device, so that even when it is connected to the device, the device may still be plugged in to a conventional adaptor in a "pass-through" fashion.

The portable electrical device may have first connector means adapted to connect to corresponding second connector means of external equipment. The first connector means provide the one or more corresponding power connectors of the portable electrical device, possibly together with one or more further connectors for other purposes such as signal or data input/output. In this case, the apparatus preferably further comprises: third connector means adapted to connect to the device's first connector means, the third connector means providing the power connector(s) of the apparatus; fourth connector means adapted to connect to the external equipment's second connector means; and a pass-through connection arrangement interconnecting at least one connector of the third connector means and a corresponding connector of said fourth connector means.

The third and fourth connector means may be on opposite faces of a power connector unit or block so that the unit or block can be sandwiched between the external equipment (e.g. a car hands-free cradle for a mobile phone) and the portable electrical device. It is not necessary for the pass-through connection arrangement to interconnect the power connectors of the third and fourth connector means, although this is preferable to enable power to be supplied from the external equipment when available. The pass-through connection arrangement could serve just to interconnect signal or data connectors of the third and fourth connector means.

If the power received by the power-receiving means must be power-conditioned before being passed to the device, the power-conditioning circuitry may optionally be incorporated into the power-receiving element or the power-connector.

Optionally, all parts of the invention, especially the adhesive, may be substantially waterproof.

Optionally, the power-receiving element may be coloured and textured such that, when adhered to the device, it appears to be a part of the device. Alternatively, or additionally, the power-receiving means may carry text or pictures, for example a logo or advertising.

Optionally, the power-receiving element may include a substantially transparent pocket into which pictures and the like may be slid.

In another embodiment, a part of the power-receiving element which must be placed in proximity with the transmitter is marked or coloured or labelled distinctively. In this way, the user can be informed of how to position or orient the power-receiving element (attached to the portable electrical device) relative to the transmitter so that power is transferred efficiently from the transmitter to the power-receiving element.

Optionally, a power indicator may be provided, optionally in the power-receiving element or the power-connector, to indicate when power is being received and/or being passed to the device. The indicator may produce light (perhaps an LED or electroluminescent panel), sound or vibration.

Optionally, the power-receiving element may be applied inside the device instead of outside, for example to the rear of the battery compartment.

Optionally, the power-connector may connect to internal power contacts within the device, possibly to its batteries and/or battery contacts.

Preferably, the power-receiving element is substantially flat. Alternatively, but preferably in addition, the power-receiving element is flexible. These features make it easy to attach the power-receiving element to the portable electrical device at a suitable internal or external surface portion thereof. When the surface portion is an internal one, having the power-receiving element substantially flat and/or flexible makes it possible to fit the element conveniently even in confined spaces such as battery compartments. When the surface portion is external, these features make it possible to attach the power-receiving element without significantly affecting the overall shape and/or ergonomics of the portable electrical device.

According to a second aspect of the present invention, there is provided in combination a portable electrical device and wireless power receiving apparatus embodying the aforesaid first aspect of the present invention.

The following non-exhaustive list illustrates some examples of devices that can be enabled using the present invention. Possibilities are not limited to those described below:

A mobile communication device, for example a radio, mobile telephone or walkie-talkie;
  A portable computing device, for example a personal digital assistant or palmtop or laptop computer;
  Portable entertainment devices, for example a music player, game console or toy;
  Personal care items, for example a toothbrush, shaver, hair curler, hair rollers;
  A portable imaging device, for example video recorder or camera;
  Containers of contents that may require heating, for example coffee mugs, plates, cooking pots, nail-polish and cosmetic containers;
  Consumer devices, for example torches, clocks and fans;
  A battery-pack for insertion into any of the above;
  A standard-sized battery cell;

In the case of unintelligent secondary devices such as a battery cell, some sophisticated charge-control means may also be necessary to meter inductive power to the cell and to deal with situations where multiple cells in a device have different charge states. Furthermore, it becomes more important for the transmitter of power to be able to indicate a "charged" condition, since the secondary cell or battery may not be easily visible when located inside another electrical device.

According to a third aspect of the present invention there is provided a power-receiving element in the form of a sticker adapted to be attached adhesively to a surface portion of a portable electrical device, the element being adapted to receive power wirelessly from a transmitter of power when the element and transmitter are in proximity with one another, and having connection means from which an electrical connection can be made to a power connector of the device.

By providing the power-receiving element in the form of a sticker the user can readily retrofit the power-receiving element to the portable electrical device.

For convenience of delivery and attachment, the sticker preferably has a removable backing sheet on its adhesive side which is removed at the time of attaching the element to the device.

The side of the sticker opposite its adhesive side may conform in appearance to surface portions of the portable electrical device that will be adjacent to that opposite side when the sticker is attached to the device. This can enable the sticker-form power-receiving element to be attached unobtrusively or invisibly to the outside of the portable electrical device.

In another embodiment the sticker has, on its side opposite its adhesive side, a substantially transparent pocket for carrying an insert. The insert may carry text or pictures, for example a logo or advertising.

According to a fourth aspect of the present invention, there is provided a replacement cover portion for a portable electrical device, the cover portion carrying or incorporating a power-receiving element adapted to receive power wirelessly from a transmitter of power when the element and transmitter are in proximity with one another, and having connection means from which an electrical connection can be made to a power connector of the device. Preferably, the replacement cover portion has substantially the same size and shape as the cover portion which it replaces. Alternatively, the replacement cover portion may be thicker than that which it replaces, or extend over the side of the portable electrical device which houses the power connector, to allow the connection means to connect to the power connector.

In one embodiment the replacement cover portion has a power connector part carrying one or more power connectors arranged to connect, when the replacement cover portion is in place on the device, to one or more corresponding power connectors of the portable electrical device. Preferably, the power connector part is connected rigidly or semi-rigidly (e.g. resiliently) to the remaining parts of the replacement cover portion so that fitting the replacement cover portion automatically brings the one or more power connectors of the replacement cover portion into electrical connection with the one or more corresponding power connectors of the portable electrical device.

In another embodiment, the replacement cover portion covers a battery compartment of the portable electrical device and has one or more battery connectors adapted to connect to one or more corresponding battery connectors of the device and/or to terminals of one or more batteries installed in the device. For example, the one or more battery connectors of the cover portion may be adapted to be interposed between the battery terminals and the corresponding battery connectors of the device.

In another embodiment, the replacement cover portion covers a battery compartment of the portable electrical device, and the cover portion further carries or incorporates at least one rechargeable battery. When the replacement cover portion is in place on the device the battery is installed operatively in the battery compartment. The power-receiving element is connected operatively to the battery for charging the battery when power is received wirelessly from the transmitter.

The replacement cover portion is, for example, a replacement cover portion for a handset of a mobile communications network.

According to a fifth aspect of the present invention, there is provided a method of adapting a portable electrical device having no wireless power receiving capability to have such a capability, the method comprising: attaching a power-receiving element to the device, the element being adapted to receive power wirelessly from a transmitter of power when the element and transmitter are in proximity with one another; and connecting one or more power connectors, which are connected electrically to the element, to one or more corresponding power connectors of the device so that power received by the element can be delivered to the device.

According to a still further aspect of the present invention, there is provided an attachable means for receiving power, the means comprising:
  i) a substantially flat power-receiving means of sufficiently small dimensions that it can attach to an existing portable device without significantly altering its ergonomics;
  ii) a power connector capable of attaching to the power input of an existing portable device; and
  iii) a means of attaching part or all of the above to a portable device.

Figure 1A:
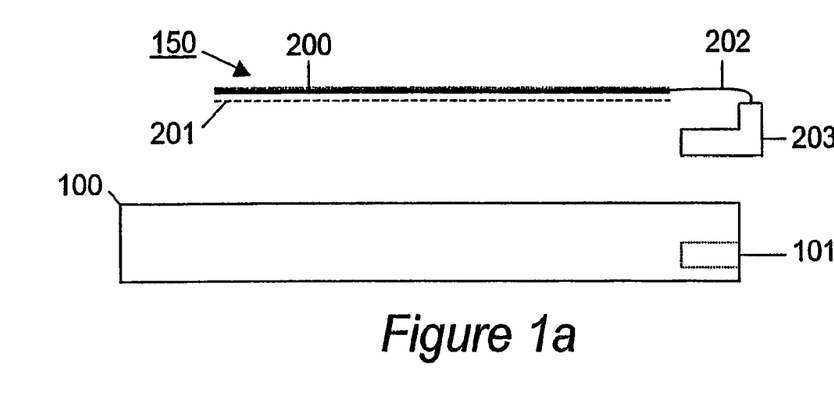
FIG. 1a shows a schematic side view of a portable electrical device and a first example of wireless power receiving apparatus embodying the present invention.
Figure 1B:
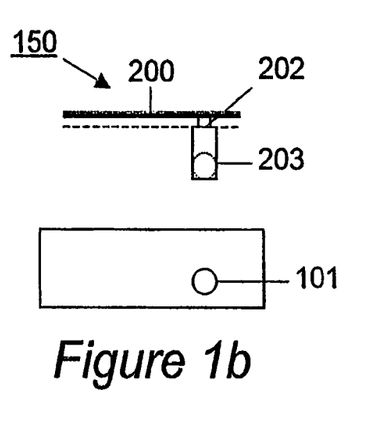
Figure 1C:
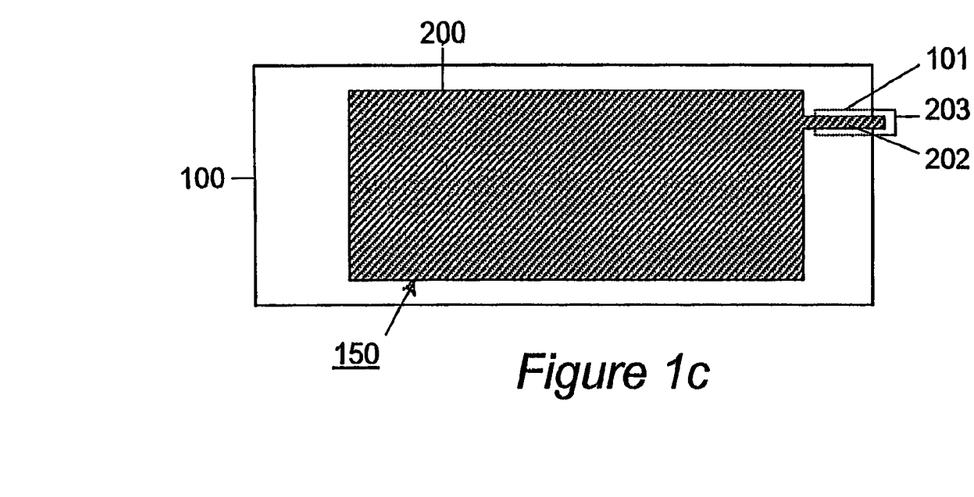

For a better understanding of the present invention and to show how it may be carried into effect, reference will now be made, by way of example only, to the accompanying drawings, in which:

FIG. 1b is a schematic end view corresponding to FIG. 1a;

FIG. 1c is a plan view corresponding to FIG. 1a;

FIG. 1 shows parts of apparatus 150 according to a first embodiment of the present invention, and an example portable electrical device (mobile handset) 100 with which the apparatus is used. As originally manufactured the device has no wireless power receiving capability.

As shown in side view in FIG. 1a the device 100 has a power-connector 101 which in this case is a socket. The apparatus 150 comprises a substantially flat power-receiving element 200, a layer of adhesive 201, a flexible connecting member (flexible wiring) 202 and a power-connector 203 capable of being plugged-in to the device's power-connector 101.

FIGS. 1b and 1c show end and plan views of the arrangement of FIG. 1a. The rear face (underside) of the mobile device 100 is uppermost in FIG. 1a, and it is to this face that the element 200 is attached.

Figure 2A:
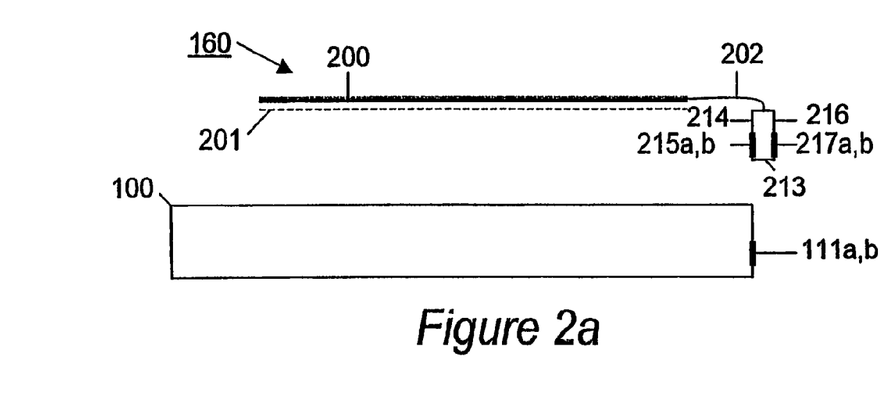
FIGS. 2a to 2c are respective schematic side, end and plan views of a portable electrical device and a second example of wireless power receiving apparatus embodying the present invention.
Figure 2B:
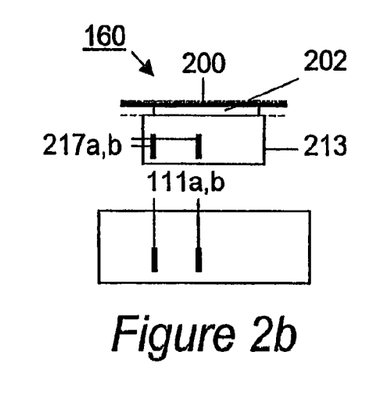
Figure 2C:
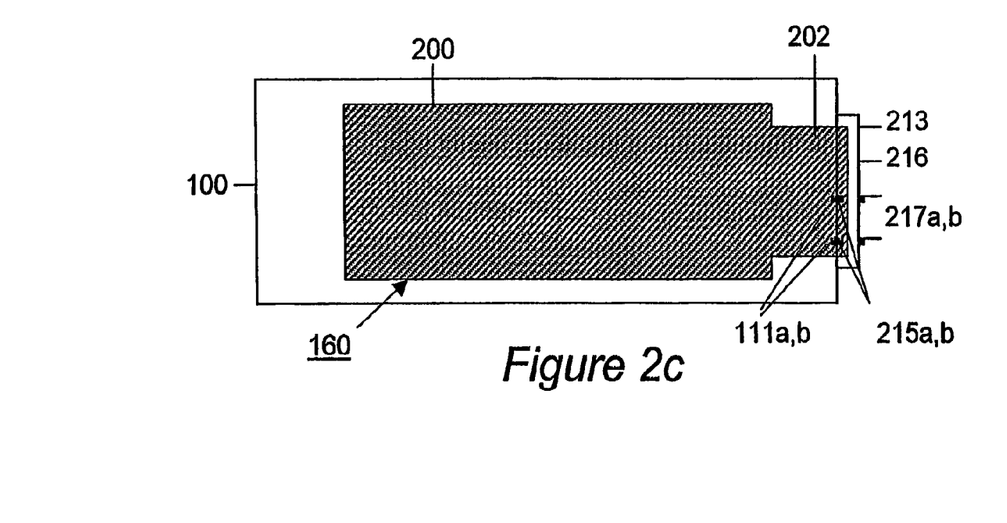

FIGS. 2a to 2c shows corresponding views to those of FIGS. 1a to 1c but for apparatus 160 according to the second embodiment of the present invention. In this case the device power connections (first connector means) 111a,b are contact strips instead of a socket. These device power connections 111a,b are adapted to connect to corresponding mating strips (second connector means—not shown) of external equipment (not shown) such as a charger. A power connector unit 213 of the apparatus has corresponding mating strips (third connector means) 215a,b on an inner face 214 thereof which make electrical contact with the device's power connections 111a, b. In addition, further connectors (fourth connector means) 217a,b are provided on an outer face 216 of the power connector unit 213 so that other equipment, for example an in-car hands-free unit or charger, having the second connector means may still be connected. These further connectors 217a,b are connected electrically to the corresponding contacts 215a,b by a pass-through connection arrangement incorporated into the power connector unit 213. The connectors 215a,b and 217a,b may include connectors used for purposes other than power delivery, for example input/output of signals and data.

Figure 3A:
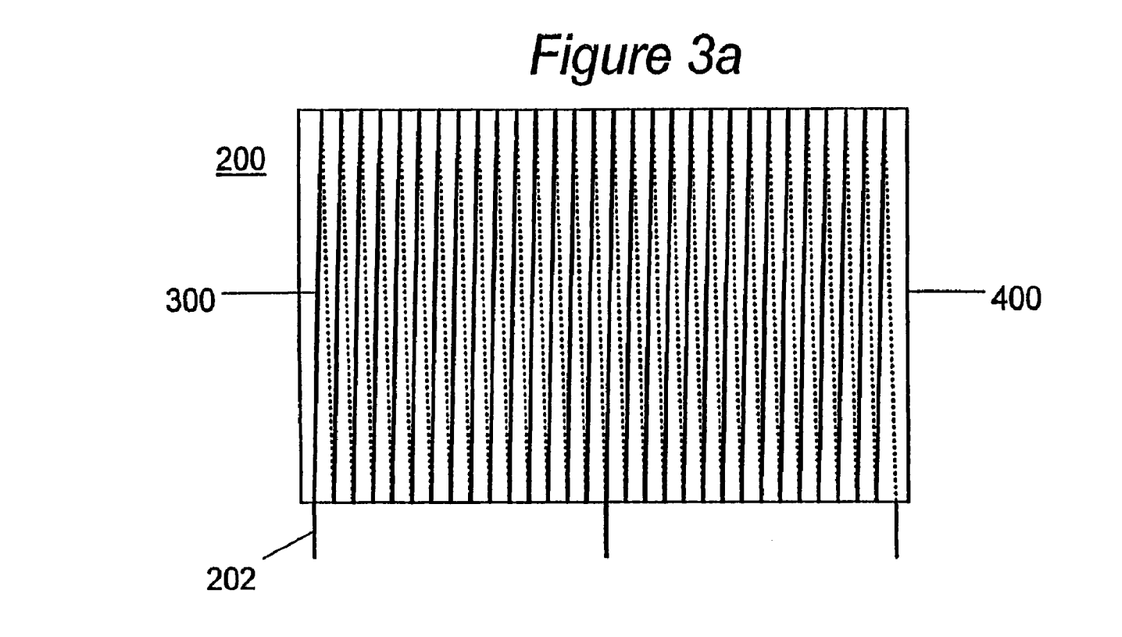
FIGS. 3a and 3b are respective schematic plan and side views of a power-receiving element embodying the present invention.
Figure 3B:
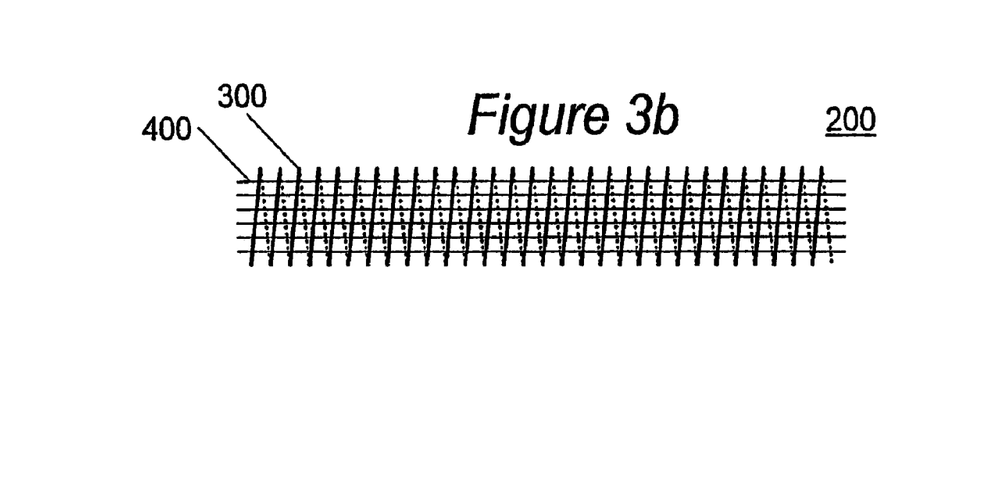

FIGS. 3a and 3b show plan and side views respectively of one example of a substantially flat power-receiving element 200 for use in embodiments of the present invention. A magnetic core consists of six strips of amorphous metal 400 each measuring 50×30×0.02 mm, stacked. Around these is wound a coil 300, which could be for example of copper wire, tape, or a stamped or pressed metal. In this case, the coil passes around the core 30 times, with a centre-tap, providing current to three connections 202 which connect to further circuitry described later with reference to FIG. 4. The entire element is readily flexible, which is useful in making it conform to any non-flat part of the device to which it is applied, and also makes it less fragile, since the entire element can be less than 0.2 mm thick.

Further information regarding the power-receiving element of the example shown in FIGS. 3a and 3b, and regarding further examples of suitable power-receiving element is given in our patent publications WO-A-03/096361 and WO-A-03/096512, the entire contents of which are incorporated herein by reference. Various designs of a transmitter of wireless power suitable for use with the power-receiving element are also disclosed in these patent publications.

Figure 4:
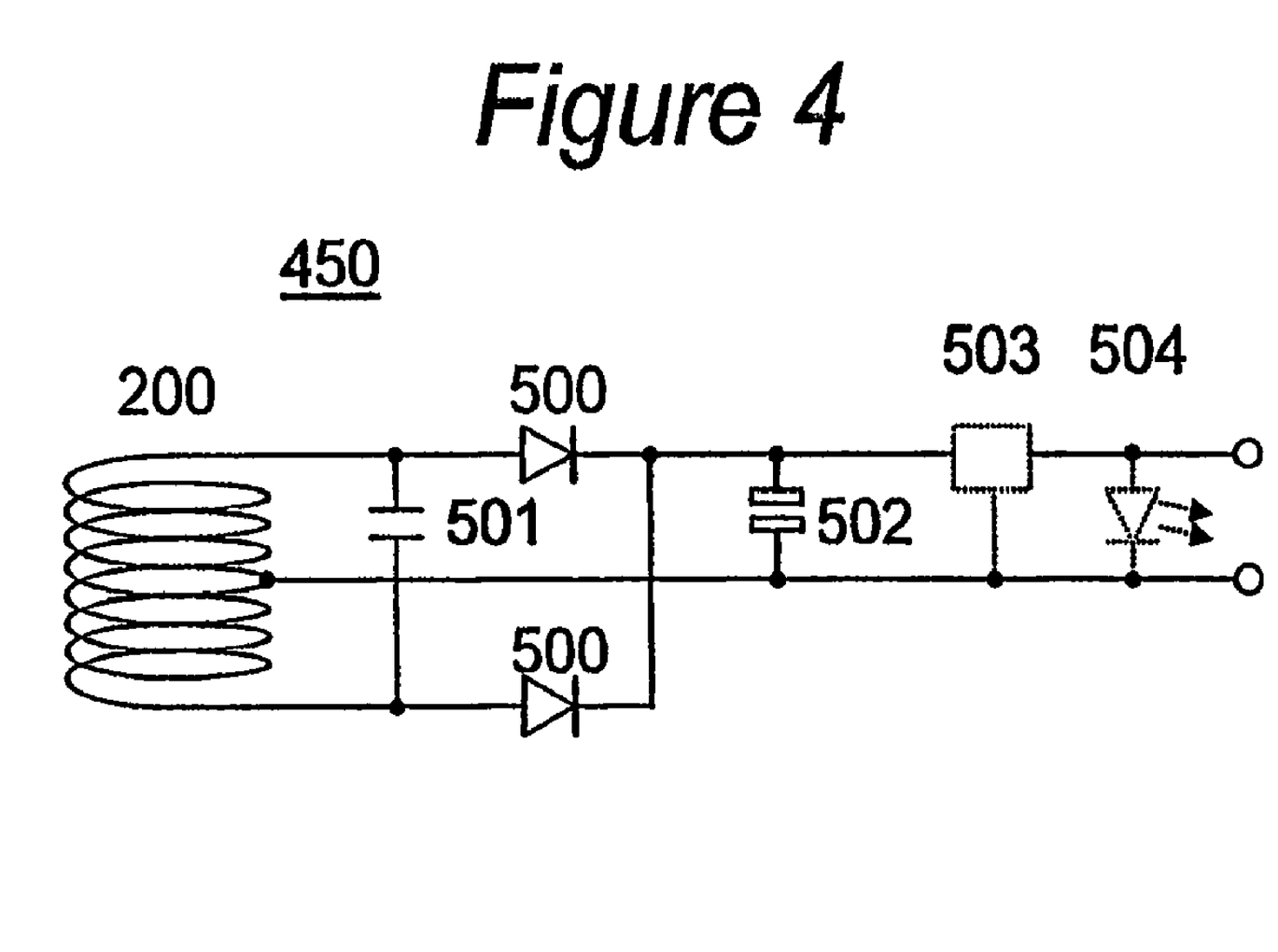
FIG. 4 shows a circuit diagram of parts of circuitry included in apparatus according to one embodiment of the present invention.

FIG. 4 shows circuitry 450 capable of converting the alternating current delivered by the power receiving element into power suitable for use in a portable electronic device. A parallel-resonating capacitor 501 tunes the coil, which allows increased power transfer. A value of 100's of nF is typical, depending on the exact core materials and coil construction, and therefore inductance. The alternating current is full-wave rectified by diodes 500. Schottky diodes with a forward voltage drop of 0.3V provide best performance. Capacitor 502 provides smoothing of the DC. The voltage at this point is unregulated, which may be sufficient to send to subsequent electronics within the portable device, if it is capable of taking such. Optional voltage regulator 503 limits the voltage for devices which are not capable of taking an unregulated supply. This regulator may be a linear or switch mode type, and may optionally also contain other protection and system management circuitry. Optional indicator 504 indicates that power is being received.

An alternative configuration to that shown in FIGS. 3a, 3b and 4 would be to use a full bridge rectifier instead of diodes 500, removing the need for the centre-tap, but increasing the total power loss. With this configuration, the tuning capacitor may be parallel-resonant or series-resonant.

Figure 5:
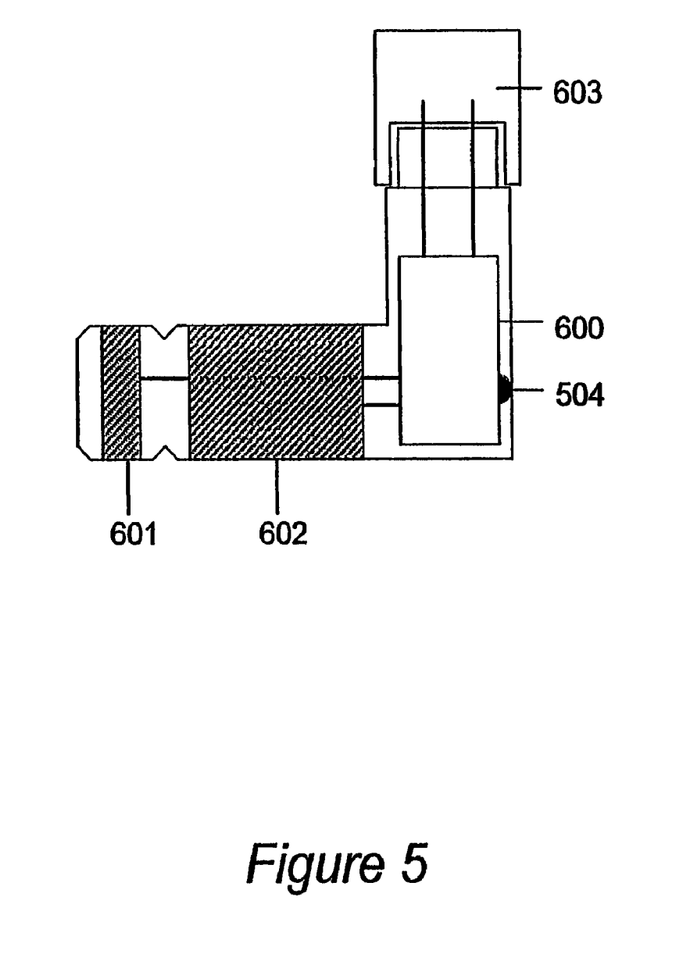
FIG. 5 shows a schematic cross-sectional view of a power connector of apparatus according to one embodiment of the present invention.

FIG. 5 shows a detail view of one implementation of a power connector 600. A barrel-shaped protrusion carries two conducting rings 601 and 602 which mate with contacts within the power input socket of the portable device. The circuitry 450 of FIG. 4 is contained within the power connector, and the optional power indicator 504 is visible externally. Optionally the connector 600 is removable from an end 603 of the flexible wiring 202, allowing different power connectors to be fitted to suit the particular device, each with the appropriate circuitry (power electronics) 450.

Alternatively, one end of the flexible wiring 202 could be removable from the power-receiving element 200 and the other end attached permanently to the power connector 600. This would allow the power connector 600 and flexible wiring 202 to be sold as one unit, and the power-receiving element to be sold as another unit. Again, this would make it possible to offer different versions of the power connector plus flexible wiring to work with different portable electrical devices, whilst offering only a single design of power-receiving element. The removable connections between the flexible wiring and the power connector and/or power-receiving element can be made by any suitable electrical connection arrangement such as a plug and socket.

Figure 6:
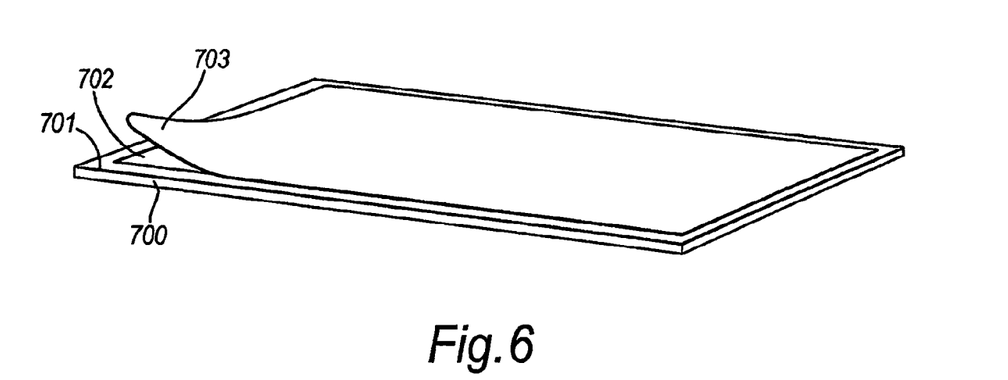
FIG. 6 shows a schematic perspective view of a power-receiving element in the form of a sticker according to one embodiment of the present invention.

A preferred implementation of the present invention is illustrated schematically in FIG. 6. In this implementation, the power-receiving element is in the form of a "sticker" 700. The element 700 has a layer of adhesive 702 on one surface 701 thereof. The element is supplied with a removable backing sheet 703 which protects the adhesive 702 prior to attachment of the element to the portable electrical device. The backing sheet 703 is peeled off by a user to expose the layer of adhesive 702 on surface 701. After peeling off the backing sheet 703 the user simply presses the power-receiving element on its adhesive side 702 to the portable electrical device.

Figure 7:
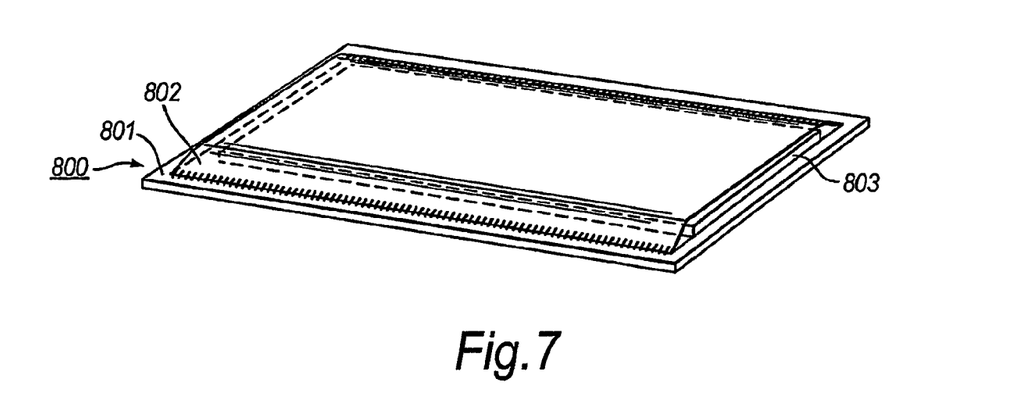
FIG. 7 shows a schematic perspective view of a power-receiving element according to another embodiment of the present invention.

FIG. 7 shows a schematic perspective view of a power-receiving element in another embodiment of the present invention. In this embodiment the power-receiving element 800 has, on its side 801 which will be visible to a user when the element is attached to the device, a transparent pocket 802. An insert 803, for example a slip of paper or card, is carried within the pocket 802. The insert may bear text or pictures, for example a logo or advertising.

Another preferred implementation of apparatus embodying the present invention is in the form of a replacement cover portion of the portable electrical device itself. There are several types of portable electrical device commercially available which have replaceable cover portions. Handsets for use in mobile communications networks made by several major manufacturers are one example. Replacement cover portions for such devices can advantageously carry or incorporate at least the power-receiving element of apparatus embodying the present invention.

Figure 8:
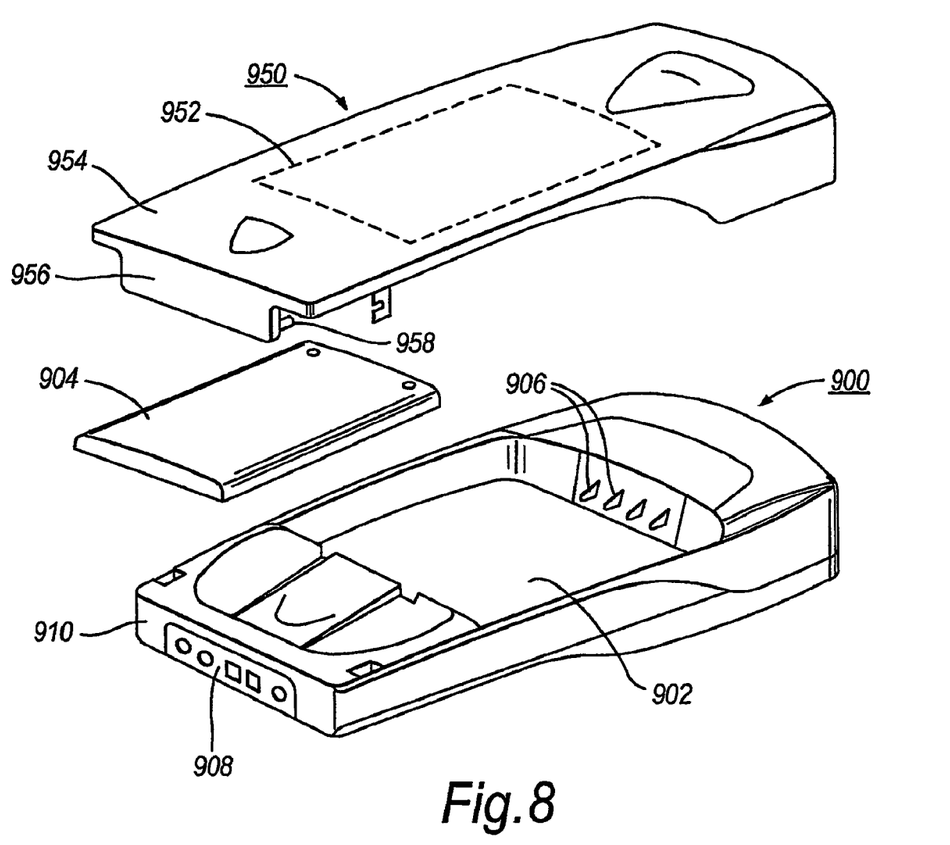
FIG. 8 shows a schematic perspective view of parts of a handset for use in a mobile communications network, a battery pack therefor and a replacement cover portion for the handset according to one embodiment of the present invention.

FIG. 8 shows a schematic perspective view of such a handset 900. The handset 900 has a battery compartment 902 for holding a removable battery pack 904. The removable battery pack 904 is, for example, a rechargeable battery pack. The battery pack 904 has terminals (not shown) which connect to corresponding battery connectors 906 of the handset 900 within the battery compartment 902 when the battery pack 904 is installed in the battery compartment. The handset 900 also has a power connector 908 at a bottom end 910 thereof.

A replacement cover portion 950 according to an embodiment of the present invention is adapted to be fitted to the handset 900. The replacement cover portion in this embodiment is a rear cover portion and covers the battery compartment 902 of the handset 900 as well as other parts thereof. The cover portion 950 has on its inner face or incorporated within it a power-receiving element 952. The element 952 may, for example, be the same as the power-receiving element 200 described hereinbefore. The cover portion 950 is designed to extend at one end 954 beyond the bottom end 910 of the handset 900. At the end 954 the cover portion 950 has a power connector part 956 carrying one or more power connectors 958. The power connector(s) is/are connected in some suitable way (not shown) to the power-receiving element 952, either directly or via power conditioning circuitry such as the circuitry 450 of FIG. 4. The power connector(s) 958 is/are adapted to connect to the corresponding power connector(s) of the handset power connector 908. This arrangement is convenient in that installation of the cover portion 950 on the handset 900 automatically makes the required electrical connections between the power-receiving element 952 and the power connector 908 of the handset. If necessary, the power connector part 956 of the cover portion 950 may be connected semi-rigidly (e.g. resiliently) instead of rigidly to the remaining parts of the cover portion 950. This can make it easier for the power connector(s) 958 of the cover portion to be connected to the corresponding power connector(s) of the handset 900 when the cover portion is being fitted to the handset.

Figure 9:
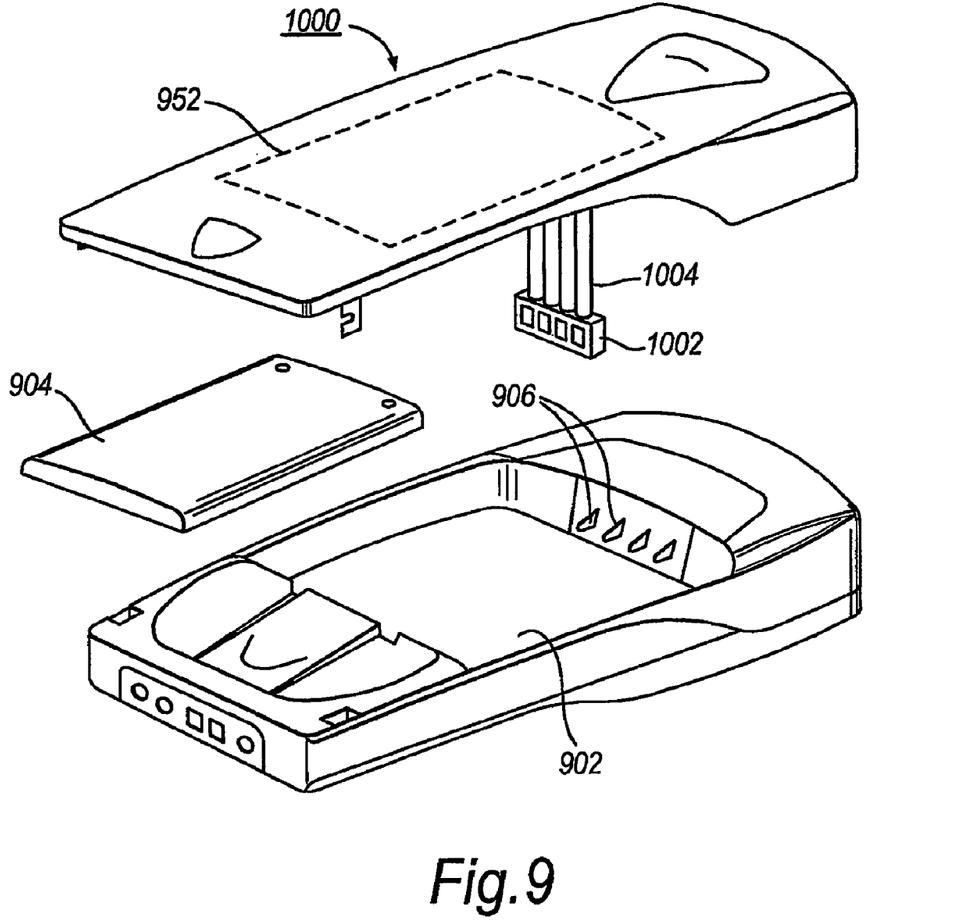
FIG. 9 shows a schematic perspective view of the handset and battery pack of FIG. 8 and a replacement cover portion for the handset according to another embodiment of the present invention.

FIG. 9 shows another embodiment in which the power-receiving element is carried by or incorporated in a replacement cover portion. In FIG. 9, a replacement cover portion 1000 does not have the extended end 954 or the power connector part 956 of the replacement cover portion 950 of FIG. 8. Instead, an internal power connector part 1002 is connected, preferably via power conditioning circuitry such as the circuitry 450 of FIG. 4, to the power-receiving element 952. The connection may be made using flexible wiring 1004. The power connector part 1002 is sufficiently thin to enable it to be interposed between the battery terminals of the battery pack 904 and the power connectors 906 formed within the battery compartment 902 of the handset 900. In a similar way to that described previously with reference to FIG. 2, the power connector part 1002 has a set of contacts on both its main faces. The two sets of contacts are connected together by a pass-through connection arrangement. This enables the power from the battery pack 904 to be supplied to the power connectors 906 when the power-receiving element is not receiving power wirelessly from a transmitter.

Figure 10:
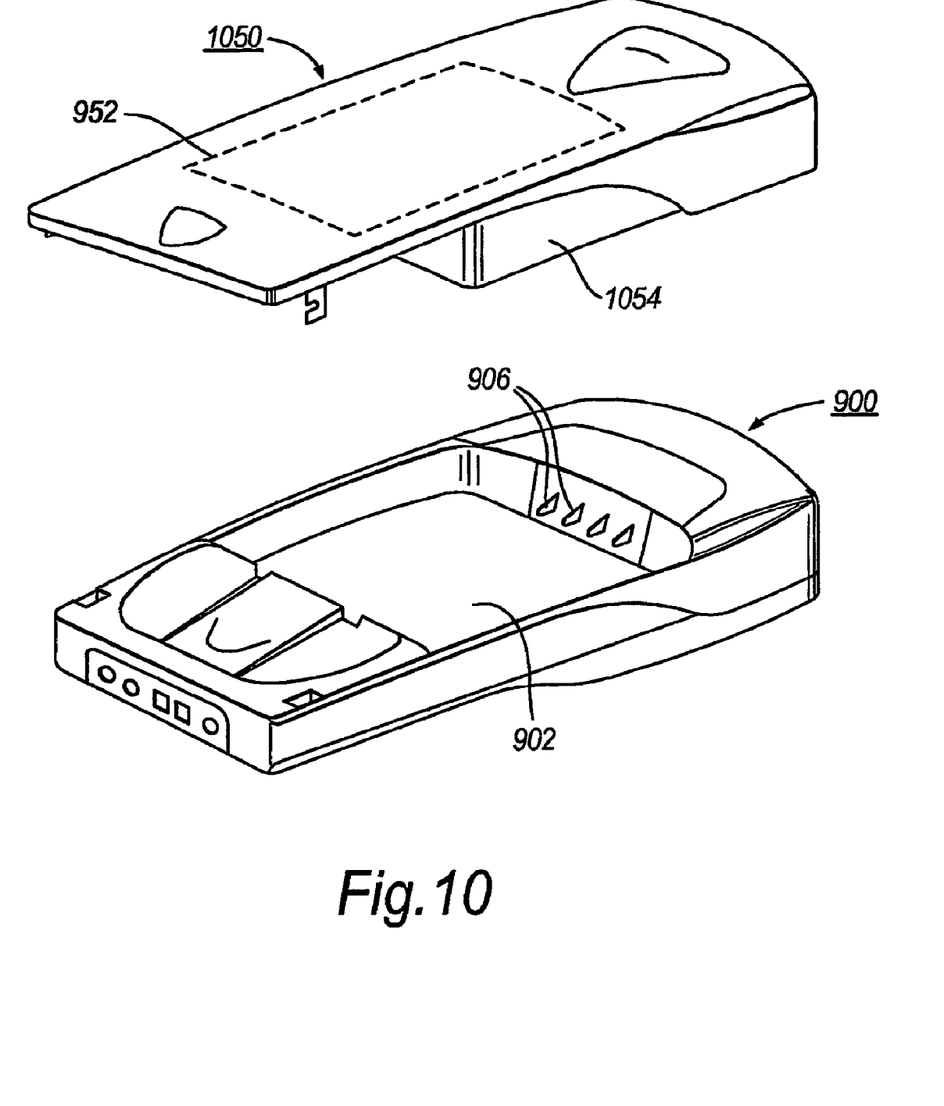
FIG. 10 shows a schematic perspective view of the handset of FIG. 8 and a replacement cover portion for the handset according to yet another embodiment of the present invention.

FIG. 10 shows yet another embodiment in which a replacement cover portion 1050 carries or incorporates a rechargeable battery pack 1054 in addition to a power-receiving element 952. The electrical connections between the power receiving element 952 and the battery pack 1054 are made by suitable means (not shown) incorporated in or carried by the cover portion 1050. The fitting of the replacement cover portion 1050 to the handset 900 brings the battery terminals of the battery pack 1054 into contact with the power connectors 906 of the handset 900.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. Inductive power-receiving adapter for use with a portable electrical device to enable the device to receive power wirelessly by electromagnetic induction, the adapter comprising:
    an inductive power-receiving element adapted to receive power wirelessly by electromagnetic induction from a transmitter of power when the element and transmitter are in proximity with one another;
    a first adapter connector for electrically connecting the inductive power-receiving adapter to a portable electrical device to deliver power received by the inductive power-receiving element to the portable electrical device;
    a second adapter connector for electrically connecting equipment to the inductive power-receiving adapter; and
    a pass-through connection in the inductive power-receiving adapter for electrically connecting the first adapter connector and the second adapter connector wherein the pass-through connection enables:
        power delivery from the equipment to the portable electrical device through the inductive power-receiving adapter and
        communication between the equipment and the portable electrical device through the adapter.

2. Adapter as claimed in claim 1, wherein said power-receiving element is adapted to be attached adhesively to the device when the adapter is in use.

3. Adapter as claimed in claim 1, further comprising mechanical attachment means adapted to attach the power-receiving element mechanically to the device when the adapter is in use.

4. Adapter as claimed in claim 1, wherein said power-receiving element forms part of a replacement cover portion of the portable electrical device.

5. Adapter as claimed in claim 1, wherein said power-receiving element and the first adapter connector are connected rigidly together, whereby connection of said first adapter connector to the portable electrical device serves to attach the power-receiving element mechanically to the device.

6. Adapter as claimed in claim 1, wherein said first adapter connector comprises a flexible connecting member for connecting said first adapter connector flexibly to said inductive power-receiving element.

7. Adapter as claimed in claim 6, wherein said flexible connecting member also serves to connect said first adapter connector electrically to the power-receiving element.

8. Adapter as claimed in claim 1, having one or more electrical connections extending between said power-receiving element and said first adapter connector, said one or more electrical connections being detachable from said power-receiving element and/or from said first adapter connector when the adapter is not in use.

9. Adapter as claimed in claim 1, wherein said first adapter connector and said second adapter connector each provide a connector for purposes other than power delivery, and said pass-through connection arrangement serves to connect corresponding connectors of said first adapter connector and said second adapter connector for said other purposes.

10. Adapter as claimed in claim 1, further comprising:
    power-conditioning circuitry operable to condition the power received by the power-receiving element prior to delivery to the portable electrical device.

11. Adapter as claimed in claim 1, wherein said power-receiving element is small relative to said portable electrical device.

12. Adapter as claimed in claim 1, wherein said power-receiving element is thin relative to said portable electrical device.

13. Adapter as claimed in claim 1, wherein a volume occupied by said power-receiving element is small in comparison with a volume occupied by said portable electrical device.

14. Adapter as claimed in claim 1, wherein said power-receiving element is of sufficiently small dimensions that, when attached to the portable electrical device, it does not substantially alter the ergonomics of the device.

15. Adapter as claimed in claim 1, wherein parts of said power-receiving element that are visible to a user of the device when the element is attached to the device have an external appearance which conforms to an external appearance of adjacent parts of the device.

16. Adapter as claimed in claim 1, wherein a part of said power-receiving element which must be placed in proximity with the transmitter is marked or colored or labeled distinctively.

17. Adapter as claimed in claim 1, wherein said power-receiving element has, at a surface thereof that is visible to a user of the portable electrical device when the element is attached to the device, a substantially transparent pocket for carrying an insert to be visible to the user.

18. Adapter as claimed in claim 1, further comprising an indicator which produces a predetermined indication of an operating state of the adapter.

19. Adapter as claimed in claim 1, wherein said power-receiving element is substantially flat.

20. Adapter as claimed in claim 1, wherein said power-receiving element is flexible.

21. In combination a portable electrical device and inductive power receiving adapter as claimed in claim 1.

22. The combination of claim 21, wherein said power-receiving element is attached to an external surface portion of the device.

23. A method of adapting a portable electrical device having no inductive power receiving capability to have such a capability by installing an inductive power-receiving adapter, the method comprising:
   providing the inductive power-receiving adapter having an inductive power-receiving element, a first adapter connector for electrically connecting the adapter to the portable electrical device, a second adapter connector for electrically connecting the adapter to equipment, and a pass-through connection electrically connecting the first adapter connector and the second adapter connector;
   attaching the inductive power-receiving element to the portable electrical device, the element being adapted to receive power wirelessly by electromagnetic induction from a transmitter of power when the element and transmitter are in proximity with one another; and
   connecting the first adapter connector to a power connector of the device so that power received by the element can be delivered to the device;
   connecting the second adapter connector to an equipment connector of equipment; and
   providing:
      power delivery from the equipment through the adapter to the portable electrical device, and
      communication between the equipment and the portable electrical device through the adapter.

* * * * *